United States Patent
Huang

(10) Patent No.: US 7,973,891 B2
(45) Date of Patent: Jul. 5, 2011

(54) LIQUID CRYSTAL PANEL HAVING REFLECTIVE FILM CORRESPONDING TO NON-DISPLAY REGION

(75) Inventor: Ming-Li Huang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 194 days.

(21) Appl. No.: 12/154,838

(22) Filed: May 27, 2008

(65) Prior Publication Data

US 2009/0002596 A1 Jan. 1, 2009

(30) Foreign Application Priority Data

May 25, 2007 (CN) .......................... 2007 1 0074610

(51) Int. Cl.
*G02F 1/1335* (2006.01)

(52) U.S. Cl. ....................................... 349/114; 349/113

(58) Field of Classification Search ........... 349/113–114
See application file for complete search history.

(56) References Cited

U.S. PATENT DOCUMENTS

| | | | | |
|---|---|---|---|---|
| 4,043,636 | A * | 8/1977 | Eberhardt et al. | 349/65 |
| 5,615,030 | A * | 3/1997 | Harada et al. | 349/110 |
| 6,972,827 | B2 * | 12/2005 | Mi | 349/200 |
| 7,119,871 | B2 | 10/2006 | Nakayoshl et al. | |
| 7,268,843 | B2 * | 9/2007 | Kawata et al. | 349/111 |
| 7,619,702 | B2 * | 11/2009 | Kwak et al. | 349/111 |
| 2001/0022634 | A1 * | 9/2001 | Chung et al. | 349/43 |
| 2002/0047970 | A1 | 4/2002 | Ono et al. | |
| 2004/0189894 | A1 | 9/2004 | Kim | |

FOREIGN PATENT DOCUMENTS

| CN | 1354381 A | 6/2002 |
|---|---|---|
| CN | 1534351 A | 10/2004 |

* cited by examiner

*Primary Examiner* — David Nelms
*Assistant Examiner* — Phu Vu
(74) *Attorney, Agent, or Firm* — Wei Te Chung

(57) ABSTRACT

An exemplary liquid crystal panel includes a first substrate assembly, a second substrate assembly parallel to the first substrate assembly, and a liquid crystal layer sandwiched between the first substrate assembly and the second substrate assembly. The second substrate assembly includes a transparent substrate and a reflective layer provided on a surface of the transparent substrate facing the first substrate assembly. The liquid crystal panel includes a display region and a non-display region. The reflective layer is positioned corresponding to the non-display region.

10 Claims, 5 Drawing Sheets

LIQUID CRYSTAL PANEL HAVING REFLECTIVE FILM CORRESPONDING TO NON-DISPLAY REGION

CROSS REFERENCE TO RELATED APPLICATION

This application claims priority from China patent Application No. 200710074610.6, filed May 25, 2007. The contents of the related application are incorporated herein by reference.

The present invention relates to a liquid crystal panel having a reflective film corresponding to a non-display region thereof, and to a liquid crystal display using the liquid crystal panel.

BACKGROUND

Liquid crystal displays have the advantages of portability, low power consumption, and low radiation, and because of this they have been widely used in various portable information products such as notebooks, personal digital assistants (PDAs), video cameras, and the like. Furthermore, liquid crystal displays are considered by many to have the potential to completely replace CRT (cathode ray tube) monitors and televisions.

Referring to FIG. 7, part of a typical liquid crystal display is schematically shown. The liquid crystal display 100 includes a liquid crystal panel 101, and a backlight module 102 used for illuminating the liquid crystal panel 101. The liquid crystal panel 101 includes a first substrate assembly 110, a second substrate assembly 130 parallel to the first substrate assembly 110, and a liquid crystal layer 120 sandwiched between the first substrate assembly 110 and the second substrate assembly 120. The backlight module 102 is provided adjacent to the first substrate assembly 110.

Referring also to FIG. 8, the first substrate assembly 110 includes a first transparent substrate 111, a number n (where n is a natural number) of gate lines 112, a number m (where m is also a natural number) of data lines 113, a plurality of thin film transistors (TFTs) 118, and a plurality of pixel electrodes 116.

The gate lines 112 are parallel to each other, with each gate line 112 extending along a first direction. The data lines 113 are parallel to each other, with each data line 113 extending along a second direction orthogonal to the first direction. The gate lines 112 and the data lines 113 cross each other, thereby defining a plurality of pixel regions (not labeled). The pixel electrodes 116 are disposed in the pixel regions, respectively.

Referring also to FIG. 9, the second substrate assembly 130 includes a second transparent substrate 131, a color filter 132 provided on an inner surface of the second transparent substrate 131, and a common electrode 133 provided on an inner surface of the color filter 132. The color filter 132 includes a plurality of red filters (not labeled), a plurality of green filters (not labeled), and a plurality of blue filters (not labeled) arrayed in a matrix. The color filter 132 further includes a black matrix 134 that fills spaces between the red filters, the green filters and the blue filters. The black matrix 134 is disposed corresponding to the gate lines 112, the data lines 113 and the TFTs 118. The black matrix 134 absorbs light beams incident thereon. Thus, an area of the liquid crystal panel 100 corresponding to the black matrix 134 is defined as a non-display region, and other areas of the liquid crystal panel 100 are collectively defined as a display region.

The backlight module 102 emits light beams for displaying. A part of the light beams transmits through the display region of the liquid crystal panel 100 such that images or text is displayed. Another part of the light beams reaches the non-display region of the liquid crystal panel 100. A majority of these light beams are absorbed by the black matrix 134, the gate lines 112, the data lines 113, and the TFTs 118, and a minority of these light beams are reflected back to the backlight module 102 by the gate lines 112, the data lines 113, and the TFTs 118.

However, a reflective ratio of the gate lines 112, the data lines 113, and the TFTs 118 is low. Therefore a rate of utilization of the light beams emitted by the backlight module 102 is correspondingly low.

What is needed, therefore, is a liquid crystal panel that can overcome the above-described deficiencies. What is also needed is a liquid crystal display employing the liquid crystal panel.

SUMMARY

In one preferred embodiment, a liquid crystal panel includes a first substrate assembly, a second substrate assembly parallel to the first substrate assembly, and a liquid crystal layer sandwiched between the first substrate assembly and the second substrate assembly. The second substrate assembly includes a transparent substrate, and a reflective layer provided on a surface of the transparent substrate facing the first substrate assembly. The liquid crystal panel includes a display region and a non-display region. The reflective layer is positioned corresponding to the non-display region.

Other novel features and advantages will become more apparent from the following detailed description of preferred and exemplary embodiments when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
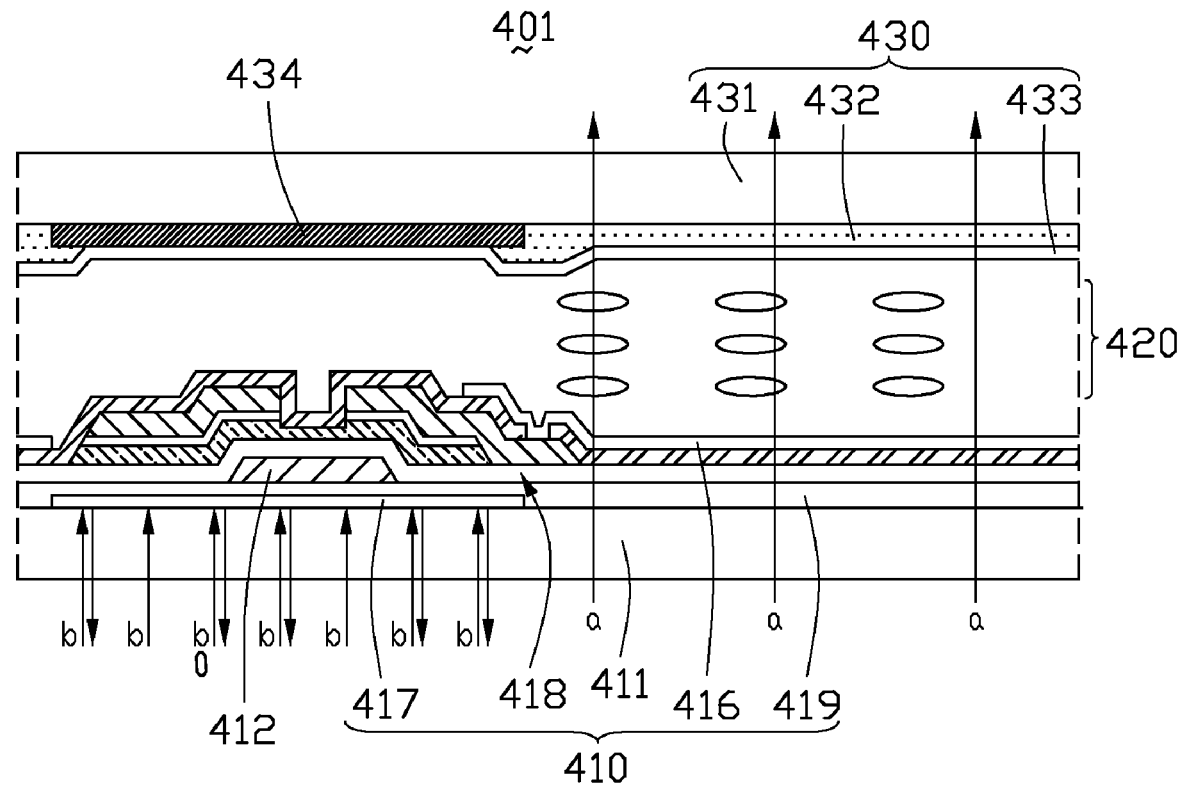
FIG. 1 is a side, cross-sectional view of part of a liquid crystal panel according to a first embodiment of the present invention, the liquid crystal display including a first substrate assembly and a second substrate assembly.

Referring to FIG. 1, part of a liquid crystal panel 401 according to a first embodiment of the present invention is shown. The liquid crystal panel 401 includes a first substrate assembly 410, a second substrate assembly 430 parallel to the first substrate assembly 410, and a liquid crystal layer 420 sandwiched between the first substrate assembly 410 and the second substrate assembly 430.

Figure 2:
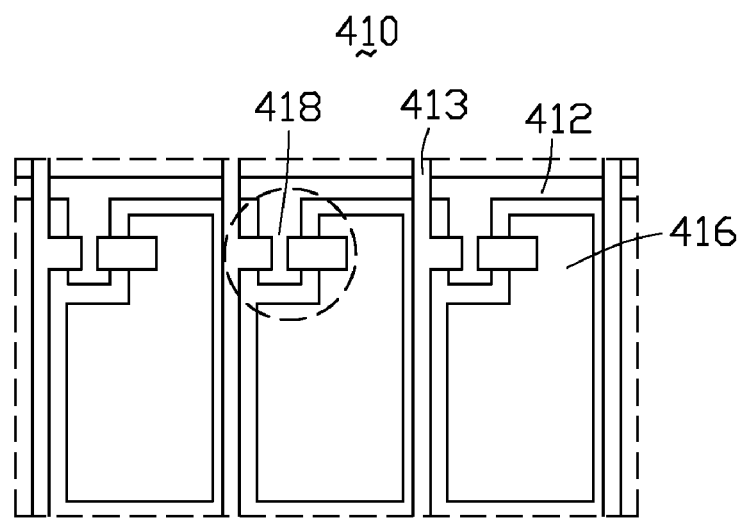
FIG. 2 is a top plan view of part of the first substrate assembly of the liquid crystal display of the first embodiment, the first substrate assembly including a reflective film (not shown).

Referring also to FIG. 2, the first substrate assembly 410 includes a first transparent substrate 411, a reflective film 417 located on a surface of the transparent substrate 411 facing toward the liquid crystal layer 420, a passivation layer 419 located on a surface of the reflective film 417 facing toward the liquid crystal layer 420 and on the surface of the first transparent substrate 411 facing toward the liquid crystal layer 420, a number n (where n is a natural number) of gate lines 412, a number m (where m is also a natural number) of data lines 413, a plurality of pixel electrodes 416, and a plurality of thin film transistors (TFTs) 418. The passivation layer 419 is made from silicon nitride.

The gate lines 412 are provided on a surface of the passivation layer 419 facing toward the liquid crystal layer 420. The gate lines 412 are parallel to each other, with each gate line 412 extending along a first direction. The data lines 413 are provided on a surface of the passivation layer 419 facing toward the liquid crystal layer 420. The data lines 413 are parallel to each other, with each data line 413 extending along a second direction that is orthogonal to the first direction. The gate lines 412 and the data lines 413 cross each other, thereby defining a plurality of pixel regions (not labeled) arranged in a matrix. Each pixel region corresponds to one TFT 418 and one pixel electrode 416.

Figure 3:
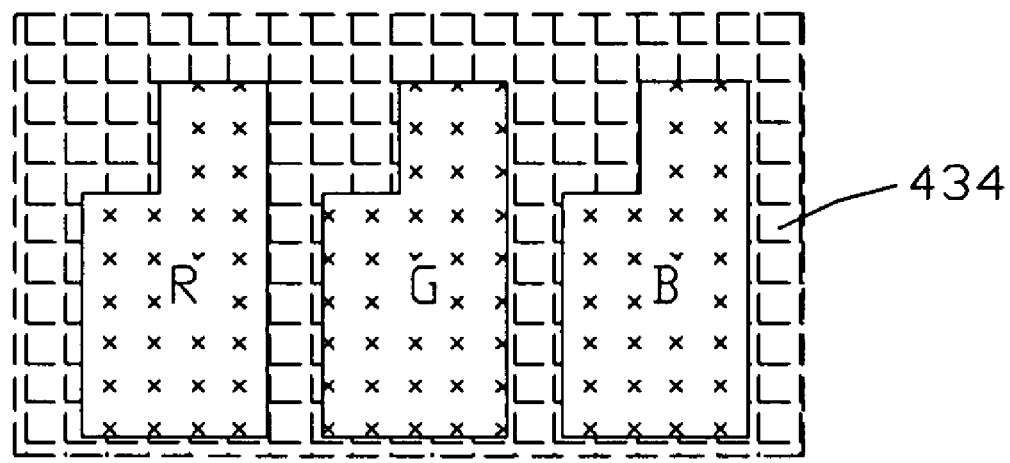
FIG. 3 is a top plan view of part of the second substrate assembly of the liquid crystal display of the first embodiment, the part shown corresponding to the part of the first substrate assembly shown in FIG. 2.

Referring also to FIG. 3, the second substrate assembly 430 includes a second transparent substrate 431, a color filter 432 located on a surface of second transparent substrate 431 facing toward the liquid crystal layer 420, and a common electrode 433 located on a surface of the color filter 432 facing toward the liquid crystal layer 420. The color filter 432 includes a plurality of red filters (not labeled), a plurality of green filters (not labeled), a plurality of blue filters (not labeled), and a black matrix 434. The red filters, the green filters, and the blue filters are arranged in a matrix. The black matrix 434 is located among the red filters, the green filters, and the blue filters. The black matrix 434 is used for filling spaces between the red filters, the green filters, and the blue filters. The black matrix 434 absorbs light beams incident thereon. An area where the black matrix 434 is located corresponds to the gate lines 412, the data lines 413, and the TFTs 418. An area of the liquid crystal panel 401 corresponding to the black matrix 434 is defined as a non-display region, and other areas of the liquid crystal display 401 are collectively defined as a display region.

Figure 4:
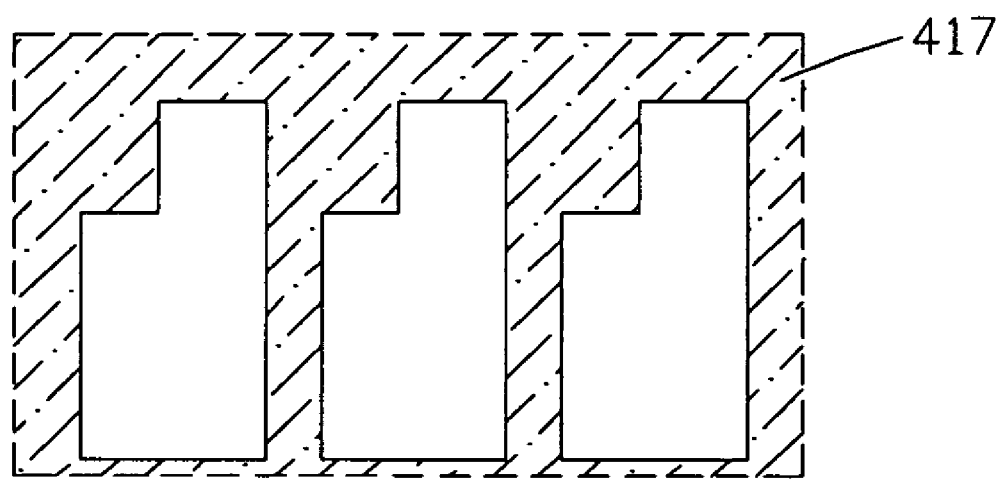
FIG. 4 is similar to FIG. 2, but showing the reflective film.

Referring also to FIG. 4, the reflective film 417 is provided on the second transparent substrate 431 corresponding to the non-display region of the liquid crystal panel 401. That is, the reflective film 417 corresponds to the black matrix 434. The reflective film 417 corresponds to the gate lines 412, the data lines 413, and the TFTs 418. The reflective film 417 is made from metal material with a high reflective ratio, such as aluminum (Al) or silver (Ag).

Light beams from a backlight module (not shown) located under the liquid crystal panel 401 can be divided into a plurality of 'a' light beams and a plurality of 'b' light beams. The 'a' light beams transmit through the display region of the liquid crystal panel 401 to provide display. The 'b' light beams reach the non-display region of the liquid crystal panel 401. The 'b' light beams are reflected by the reflective film 417 back to the backlight module. Typically, a majority of the 'b' light beams are reflected again by the backlight module back to the display region of the liquid crystal panel 401. The 'b' light beams accordingly pass through the display region of the liquid crystal panel 401. Therefore, a utilization ratio of the light beams is increased correspondingly.

Compared with a conventional liquid crystal panel, the liquid crystal panel 401 includes the reflective film 417. The reflective film 417 reflects the light beams reaching the non-display region of the liquid crystal panel 401 back to the backlight module to be re-utilized. Therefore, a utilization ratio of light beams of the liquid crystal panel 401 is improved.

Figure 5:
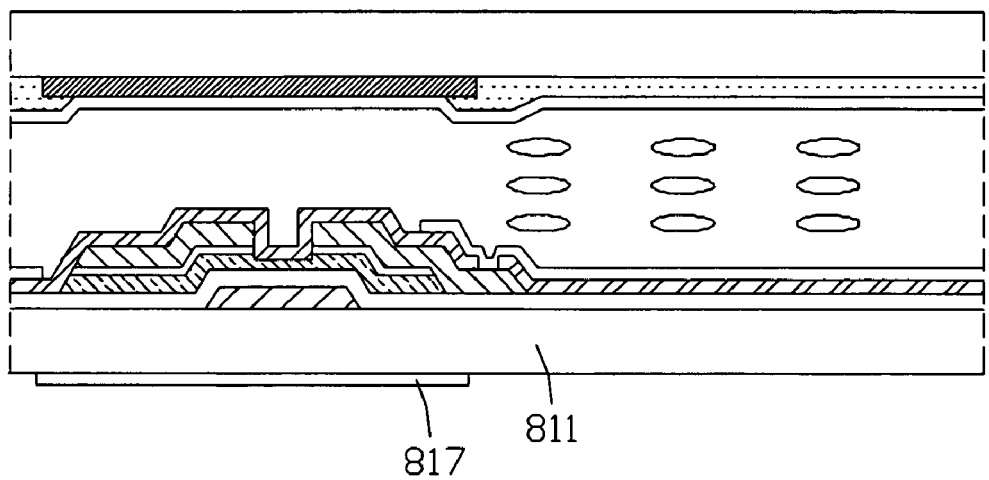
FIG. 5 is a side, cross-sectional view of part of a liquid crystal panel according to a second embodiment of the present invention.

Referring to FIG. 5, part of a liquid crystal panel 801 according to a second embodiment of the present invention is shown. The liquid crystal panel 801 is similar to the liquid crystal panel 401. However, the liquid crystal panel 801 includes a reflective film 817 located on a lower surface of a first transparent substrate 811. The reflective film 817 corresponds to a non-display region of the liquid crystal panel 801. No passivation layer is needed.

Figure 6:
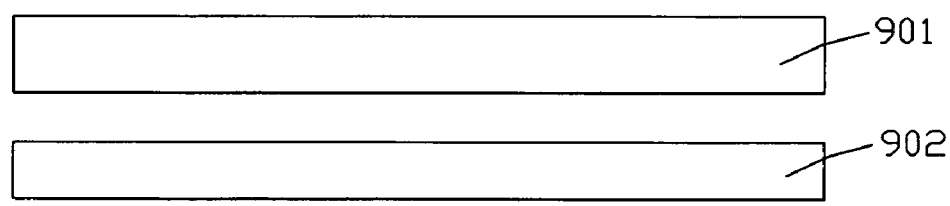
FIG. 6 is an exploded, side plan view of a liquid crystal display according to another embodiment of the present invention, the liquid crystal display including the liquid crystal panel of either the first embodiment or the second embodiment.
Figure 7:
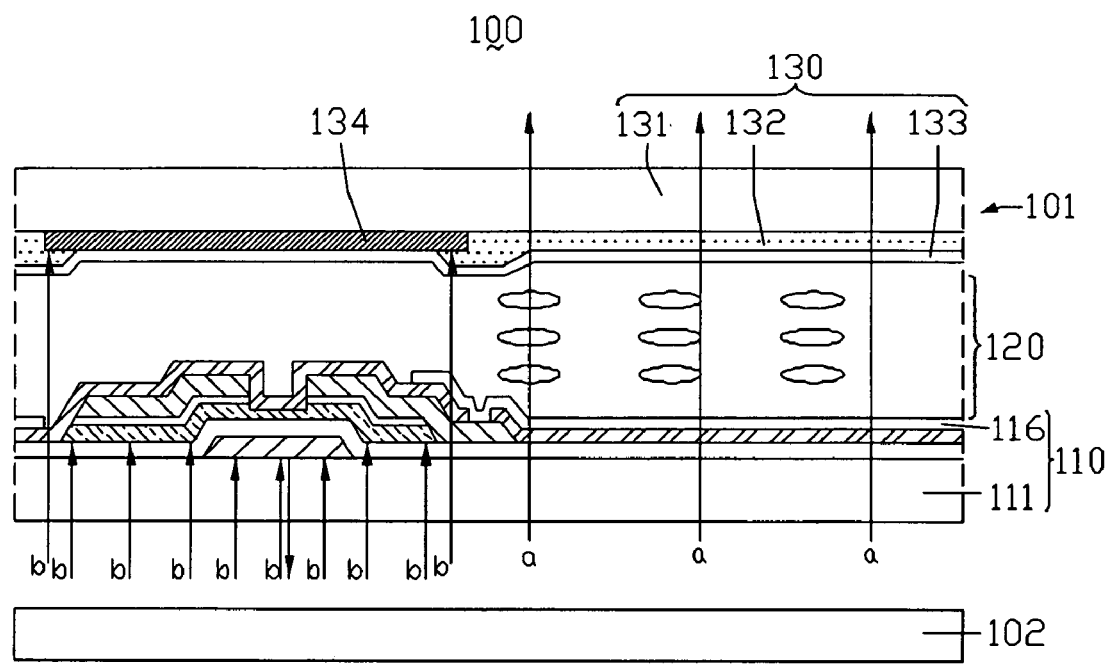
FIG. 7 is a side, cross-sectional view of part of a conventional liquid crystal display, the liquid crystal display including a first substrate assembly and a second substrate assembly.
Figure 8:
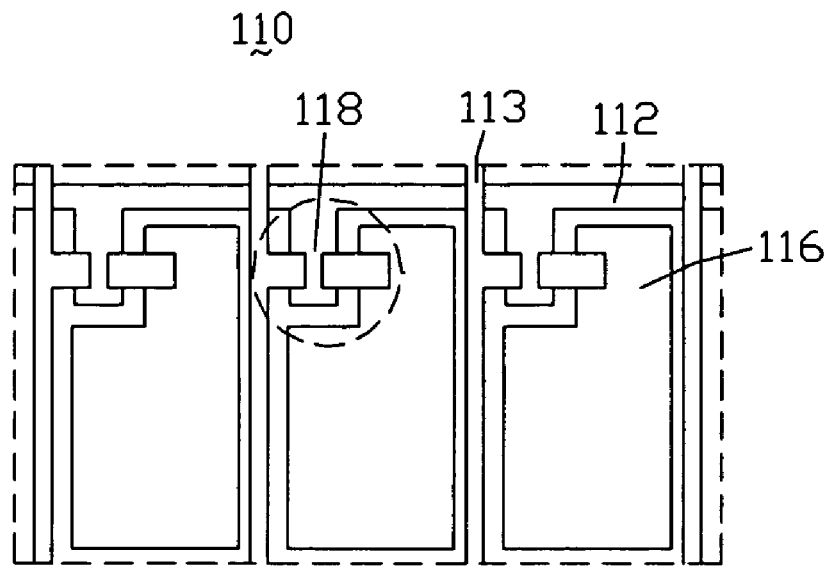
FIG. 8 is a top plan view of part of the first substrate assembly of the conventional liquid crystal display of FIG. 7.
Figure 9:
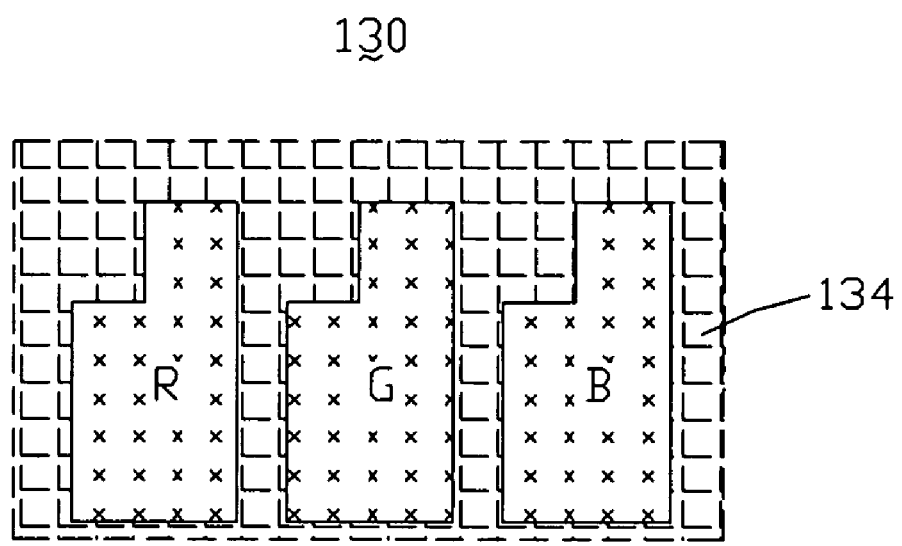
FIG. 9 is a top plan view of part of the second substrate assembly of the conventional liquid crystal display of FIG. 7, the part shown corresponding to the part of the first substrate assembly shown in FIG. 8.

Referring to FIG. 6, a liquid crystal display 900 according to another embodiment of the present invention is shown. The liquid crystal display 900 includes a liquid crystal panel 901, and a backlight module 902 disposed at a bottom side of the liquid crystal panel 901. The backlight module 902 is used for providing uniform light beams for the liquid crystal panel 901. The liquid crystal panel 901 can be one of the liquid crystal panels 401, 801 described above. Unlike with a conventional liquid crystal display, the liquid crystal display 900 includes the liquid crystal panel 901 having a reflective film (not shown) corresponding to a non-display region thereof. Light beams reaching the non-display region are reflected back to the backlight module 902, and are reflected again by the backlight module 902 back to the liquid crystal panel 901. Many of most of these reflected light beams reach a display region of the liquid crystal panel 901 and are thus utilized. Therefore, a utilization ratio of the liquid crystal display 900 is improved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A liquid crystal panel comprising:
   a first substrate assembly;
   a second substrate assembly parallel to the first substrate assembly, the second substrate assembly comprising:
   a transparent substrate;
   a plurality of thin film transistors directly formed on a surface of the transparent substrate that faces the first substrate assembly; and a reflective layer provided directly on a surface of the transparent substrate that faces away from the first substrate assembly; and a liquid crystal layer sandwiched between the first substrate assembly and the second substrate assembly, the liquid crystal panel defining a display region and a non-display region, the reflective layer positioned corresponding to the non-display region and the thin film transistors along a direction substantially perpendicular to the transparent substrate, and the thin film transistors positioned corresponding to the non-display region along the direction substantially perpendicular to the transparent substrate.

2. The liquid crystal panel of claim 1, further comprising a color filter assembly, wherein the color filter assembly comprises a plurality of red filters, a plurality of green filters, a plurality of blue filters, and a black matrix, the red filters, the green filters, and the blue filters being arranged in a matrix, the black matrix filling spaces between the red filters, the green filters, and the blue filters, and the black matrix positioned corresponding to the non-display region.

3. The liquid crystal panel of claim 2, wherein the second substrate assembly further comprises a plurality of parallel gate lines each extending along a first direction, and a plurality of parallel data lines each extending along a second direction perpendicular to the first direction, wherein the plurality of thin film transistors are provided in the vicinity of intersections of the gate lines and the data lines as well as being positioned corresponding to the non-display region along the direction substantially perpendicular to the transparent substrate, and the gate lines and the data lines are positioned corresponding to the non-display region.

4. The liquid crystal panel of claim 1, wherein the reflective layer is made from metal materials having a high reflective ratio.

5. The liquid crystal panel of claim 1, wherein the reflective layer is made from at least one of aluminum and silver.

6. A liquid crystal display comprising:
a liquid crystal panel; and
a backlight module adjacent the liquid crystal panel, the backlight module configured for providing light beams for the liquid crystal panel;
wherein the liquid crystal panel comprises:
a first substrate assembly;
a second substrate assembly parallel to the first substrate assembly, the second substrate assembly comprising:
a transparent substrate;
a plurality of thin film transistors directly formed on a surface of the transparent substrate that faces the first substrate assembly; and
a reflective layer provided directly on a surface of the transparent substrate that faces away from the first substrate assembly; and
a liquid crystal layer sandwiched between the first substrate assembly and the second substrate assembly,
the liquid crystal panel defining a display region and a non-display region, the reflective layer positioned corresponding to the non-display region along a direction substantially perpendicular to the transparent substrate, and the thin film transistors positioned corresponding to the non-display region along the direction substantially perpendicular to the transparent substrate.

7. The liquid crystal display of claim 6, wherein the liquid crystal panel further comprises a color filter assembly, the color filter assembly comprises a plurality of red filters, a plurality of green filters, a plurality of blue filters, and a black matrix, the red filters, the green filters, and the blue filters being arranged in a matrix, the black matrix filling spaces between the red filters, the green filters, and the blue filters, and the black matrix positioned corresponding to the non-display region.

8. The liquid crystal display of claim 7, wherein the second substrate assembly further comprises a plurality of parallel gate lines each extending along a first direction, and a plurality of parallel data lines each extending along a second direction perpendicular to the first direction, the plurality of thin film transistors are provided in the vicinity of intersections of the gate lines and the data lines as well as being positioned corresponding to the non-display region along the direction substantially perpendicular to the transparent substrate, and the gate lines and the data lines are positioned corresponding to the non-display region.

9. The liquid crystal display of claim 7, wherein the reflective layer is made from metal materials having a high reflective ratio.

10. The liquid crystal display of claim 7, wherein the reflective layer is made from at least one of aluminum and silver.

* * * * *